US011180619B2

(12) United States Patent
Costa et al.

(10) Patent No.: US 11,180,619 B2
(45) Date of Patent: Nov. 23, 2021

(54) FILM WITH MODERATE CROSSLINKING

(71) Applicant: BOREALIS AG, Vienna (AT)

(72) Inventors: Francis Costa, Linz (AT); Mattias Bergqvist, Goteberg (SE); Stefan Hellstrom, Kungalv (SE); Bert Broeders, Beringen (BE); Girish Suresh Galgali, Linz (AT); Tanja Piel, Linz (AT); Bernt-Ake Sultan, Stenungsund (SE); Bart Verheule, Schelle (BE); Jeroen Oderkerk, Stenungsund (SE)

(73) Assignee: BOREALIS AG, Vienna (AT)

( * ) Notice: Subject to any disclaimer, the term of this patent is extended or adjusted under 35 U.S.C. 154(b) by 96 days.

(21) Appl. No.: 16/519,884

(22) Filed: Jul. 23, 2019

(65) Prior Publication Data
US 2019/0375905 A1 Dec. 12, 2019

Related U.S. Application Data

(62) Division of application No. 15/510,954, filed as application No. PCT/EP2015/071072 on Sep. 15, 2015, now abandoned.

(30) Foreign Application Priority Data

Sep. 18, 2014 (EP) .................................... 14185403

(51) Int. Cl.
C08J 5/18 (2006.01)
C08K 5/3435 (2006.01)
C08K 5/3492 (2006.01)
C08K 5/3432 (2006.01)
C08K 5/00 (2006.01)
C08K 5/524 (2006.01)
B32B 17/10 (2006.01)
B32B 27/18 (2006.01)

(52) U.S. Cl.
CPC ................ C08J 5/18 (2013.01); B32B 17/10 (2013.01); B32B 17/1055 (2013.01); B32B 27/18 (2013.01); C08K 5/005 (2013.01); C08K 5/3432 (2013.01); C08K 5/3435 (2013.01); C08K 5/3492 (2013.01); C08K 5/34926 (2013.01); C08K 5/524 (2013.01)

(58) Field of Classification Search
None
See application file for complete search history.

(56) References Cited

U.S. PATENT DOCUMENTS

| | | | |
|---|---|---|---|
| 5,883,144 A | 3/1999 | Bambara et al. | |
| 6,232,376 B1 | 5/2001 | Kiroku et al. | |
| 2003/0000730 A1* | 1/2003 | Kwok | H01R 12/79 |
| | | | 174/117 F |
| 2003/0132017 A1* | 7/2003 | Barioz | C08L 51/06 |
| | | | 174/24 |
| 2007/0255005 A1 | 11/2007 | Yoshiteru | |
| 2008/0132657 A1 | 6/2008 | Kenneth et al. | |
| 2011/0190411 A1 | 8/2011 | Michael et al. | |

FOREIGN PATENT DOCUMENTS

| | | |
|---|---|---|
| EP | 1524292 A1 | 4/2005 |
| EP | 2144301 A1 | 1/2010 |
| EP | 2 251 365 A1 | 11/2010 |
| EP | 5130452 B2 | 1/2013 |
| EP | 2562768 A1 | 2/2013 |
| JP | S51-150594 A | 12/1976 |
| JP | S55-9612 A | 1/1980 |
| JP | S61-53346 A | 3/1986 |
| JP | 2012-094845 B2 | 5/2012 |
| JP | 2012-92197 A | 10/2013 |
| JP | 2013-221430 A | 10/2013 |
| JP | 2013-224354 A | 10/2013 |
| JP | 2014-51582 A | 3/2014 |
| JP | 2014-168608 A | 9/2014 |
| JP | 2015-174172 A | 10/2015 |
| WO | 97/24023 A2 | 7/1997 |
| WO | 2009/056409 A1 | 5/2009 |
| WO | 2010/000479 A1 | 1/2010 |
| WO | 2013/159942 A2 | 10/2013 |

OTHER PUBLICATIONS

Canadian Office action for Patent Application No. 2961125, dated Sep. 14, 2018.
Notice of Reasons for Rejection for Japanese Application No. 2017-514415, dated Dec. 5, 2017.
Google Patents version of Fagrell (WO 2009/056409), retrieved Dec. 19, 2017.
Notice of Reasons for Rejection for Japanese Application No. 2017-514415, dated Sep. 12, 2017.
James C. Randall, "A Review of High Resolution Liquid 13Carbon Nuclear Magnetic Resonance Characterizations Uf Ethylene-Based Polymers", C29 201, 1989.
"Polyethylene: High-pressure", Encyclopedia of Materials Science and Technology, 2001, pp. 7181-7184.
"Ethylene Polymers, Hope", Encyclopedia of Polymer Science and Engineering, vol. 2, pp. 382-410.

* cited by examiner

Primary Examiner — Robert T Butcher

(74) Attorney, Agent, or Firm — Tarolli, Sundheim, Covell & Tummino LLP

(57) ABSTRACT

A polymer composition with a polymer of ethylene with a comonomer with silane group(s) containing units and an additive that is an organic compound with at least one amine moiety that has a gel content less than 10 wt % after 7 days at ambient conditions and a gel content of at least 15 wt % gel content after 14 days at 100° C.

The film can be used in a laminate.

18 Claims, No Drawings

FILM WITH MODERATE CROSSLINKING

FIELD OF THE INVENTION

This invention relates to a film. The film is made from a polymer composition having a polymer of ethylene (a) with a comonomer with silane group(s) containing units that are hydrolysable and an additive (b), wherein the additive is an organic compound which comprises at least one amine moiety. The film has the characteristic that it has a gel content less than 10 wt % after 7 days at ambient conditions and a gel content of at least 15 wt % gel content after 14 days at 100° C.

The invention also relates to a process for making the film and a laminate with the film.

BACKGROUND OF INVENTION

There are many and various laminates. The laminate sought by this invention is a laminate that comprise at least one glass layer and at least one layer made of a polymer. The object of these two layers is good optical properties and good high temperature properties, i.e. that the laminate can be used in warm places. Commonly other layers with further functionality are added.

The most common prior art polymer composition is peroxide crosslinked ethylene-vinyl acetate (EVA) copolymer which is extruded as a sheet from an EVA copolymer composition comprising an organic peroxide as a crosslinking agent and stabilisers. Crosslinking of the EVA is necessary to provide the layer with sufficient strength at higher temperatures, because in use, the temperature is typically 40° C. to 80° C.

The laminated film is typically produced in a vacuum lamination process. In this process, the components of the laminate, after having been assembled, are put into a vacuum lamination apparatus, in which by application of an increased temperature of about 100° C. to 180° C., typically 150° C., and an increased membrane pressure for a time of from about 10 to 30 minutes the laminate is formed under vacuum.

One drawback of peroxide crosslinked EVA as layer in a laminate is the comparatively high temperatures and long lamination times which are caused by the need to decompose the organic peroxide in the laminate and in order to achieve the crosslinking reaction. Thus, the production speed of the laminate is low.

The use of peroxide crosslinked EVA as polymer layer has, however, further drawbacks. It is well known that laminates show optical degradation with time which may occur as a discolouration of the originally colourless, transparent films. Furthermore, other problems have been reported such as a delamination at interfaces, penetration of water and arcing, cracking due to expansion/contraction stresses, and weathering.

It is an object of the present invention to provide a film material with which the drawbacks of the known technologies, especially the use of peroxide crosslinked polymers as film material, are greatly reduced. In particular, it is an object of the invention to provide a film for a laminate which allows to improve and facilitate the production process of the laminate, e.g. by shortening the time necessary for lamination of the laminate, and, at the same time, has a lower tendency to degrade.

Polyvinyl butyral (PVB) is a common film layer material for laminates with glass layers. The PVB film has good adhesion and optical properties. The material has a high polarity which attracts water. EVA has the same problem. Furthermore, PVB is extremely soft and tacky. Therefore, the PVB film must be used with a release or liner layer. Otherwise the roller of PVB film will be hard to unwind.

PRIOR ART

EP1524292 describes a method to crosslink silane-grafted EVA with a hindered amine to be used in cables. The examples show fast crosslinking at elevated temperatures, which implies moderate crosslinking at ambient conditions.

EP2562768 describes a cable layer with a polyethylene with hydrolysable silane group(s) and a silanol condensation catalyst that is a secondary amine. The crosslinking speed is high and in table 4 the crosslinking is immediate at elevated temperatures.

The general problem of the prior art is to find a fast as possible crosslinking speed.

BRIEF SUMMARY OF INVENTION

The invention is a film comprising a polymer composition
a polymer of ethylene (a) with a comonomer with silane group(s) containing units that are hydrolysable and
at least one additive (b), wherein the additive is an organic compound which comprises at least one amine moiety
wherein the film has a gel content less than 10 wt % after 7 days at ambient conditions and a gel content of at least 15 wt % gel content after 14 days at 100° C., when measured as described in "Test methods".

Polymers are defined to have more than at least 1000 repeating units. The definition of polymer of ethylene is a polymer with more than 50 wt % of ethylene monomer. The polyethylene can further comprise alfa-olefines and comonomers with vinyl group(s) and functional group(s) such as polar comonomers.

Silane group(s) that are hydrolysable mean that a silanol condensation reaction can form covalent bonds with other silane group(s). The silane group(s) can make covalent bonds with other silane group(s) of the silane crosslinkable polymer and form a network. The network degree can for example be measured by creep or gel content. Another advantage of the silane group(s) is that the polymer is compatible with the glass layer and a good adhesion will be achieved. Since the silane group(s) are covalently bonded to the polymer backbone they can't be enriched in for example the surface of the film. The film will be more uniform and consistent, meaning that the homogenous film will have no starting points for delamination from other layers.

Gel content is a measure of the degree of the crosslinking network. The method for measuring gel content is described in the "Test method". A high gel content means a complete network is formed including more or less the entire polymer composition. The object of this invention is to make a film for a laminate with a front glass layer with at least one layer made of the polymer composition.

Gel content is a common method for measuring the crosslinking degree of a polymer. In certain applications are creep a more proper method to measure the high temperature properties. Since this parameter is application specific and uncommon, the property of gel content has been chosen.

Laminate assembly is made in several steps. First step is to make a film comprising a base resin and proper additivation such as antioxidants and further stabilisers such as process stabilisers, metal deactivators, and especially UV stabilisers.

The film is usually made at a film producer and shipped to the laminate assembler. The laminate is made by laminating the film to make the laminate with a front glass layer with at least one layer made of the polymer composition. It is essential that the film that is to be laminated has a low gel content. Lamination using a crosslinked film gives low adhesion, meaning that the laminate will easily delaminate. It is essential that the crosslinking takes part after the lamination.

The activity of an additive (b) comprising at least one amine moiety is hard to predict. A person skilled in the art can identify from a list of available additives, with the guidance that the film shall have a gel content less than 10 wt % after 7 days at ambient conditions and a gel content of at least 15 wt % gel content after 14 days at 100° C. a proper additive (b) comprising at least one amine moiety. The activity is depending on activity of the additive with at least one amine moiety, on the type if silane group(s), moisture content, temperature, the polymer composition and other additives.

In order to be able to laminate the film, it must be non-crosslinked, i.e. has a gel content less than 10 wt % (defined as non-crosslinked). The silanol condensation reaction is non-active when it is not needed. If the laminate is installed in a warm place, i.e. in a desert, the condensation reaction will kick in. The material will be crosslinked and the creep properties will be improved.

The invention is using an additive with at least one amine moiety that condensate the silane group(s) extremely slow.

One advantage is that the system is dormant when not needed and active when needed. If the laminate is exposed to high heat the additive with at least one amine moiety will kick in and crosslink the film.

THE INVENTION IN DETAIL

In one embodiment of the invention the film has a gel content suitably less than 8 wt % after 7 days at ambient conditions and more suitably less than 5 wt % after 7 days at ambient conditions. Further the film has a gel content of at least 20 wt % after 14 days at 100° C. and more suitably gel content of at least 30 wt % after 14 days at 100° C., when measured as described in "Test methods".

The polymer of ethylene (a) with a comonomer with silane group(s) containing units that are hydrolysable is suitably in an amount of at least 80 wt % of the polymer composition more suitably, more than 90 wt % of the polymer composition.

The polymer composition can contain a smaller fraction of further polymer(s). It is essential that these polymer fractions form one phase with the polymer of ethylene (a) with a comonomer with silane group(s) containing units that are hydrolysable. If the polymers are forming two or more phases the optical performance of the polymer blend will deteriorate. Further polymer fractions are usually added as master batches to additivate the polymer composition.

In one embodiment of the invention the polymer of ethylene (a) with a comonomer with silane group(s) containing units that are hydrolysable has suitably a density of at least 900 kg/m$^3$ and more suitably a density of at least 910 kg/m$^3$ and most suitably a density of at least 920 kg/m$^3$, suitably is the density less than 960 kg/m$^3$ or more suitably less than 950 kg/m$^3$.

The polymer of ethylene (a) with a comonomer with silane group(s) containing units that are hydrolysable can be made by several conventional processes. The hydrolysable silane group(s) may be introduced into the polyethylene by copolymerisation of e.g. ethylene monomers with silane group containing comonomer(s) or by grafting, i.e. by chemical modification of the polymer by addition of silane group(s) mostly in a radical reaction. Benefits of copolymerisation are that no polar peroxide residues or unreacted vinyl silanes are present in the final article. This will make the final product more uniform with better consistency and improved quality. Storage stability of the copolymerised ethylene with vinyl triethoxy silane and/or vinyl trimethoxy silane made in a high pressure radical process is greatly improved compared to grafted solutions. Another benefit is less handling of liquid vinyl silanes which are flammable and have a strong odour. Further benefits are less scrap, less scorch (premature crosslinking in extruder) and longer production runs (less cleaning of extruders). Copolymerisation is the preferred production process of the polymer of ethylene (A) with silane group(s) containing units. The amount of silane group(s) can be decreased compared to grafting while retaining same adhesion. The reason for this is that all silane group(s) are copolymerised while grafted polymer usually contains unreacted silane with peroxide residues.

The polymer made by copolymerisation in a high pressure radical process is referred to as low density polyethylene (LDPE) if the polymer constitutes more than 50 wt % of ethylene monomers. The polymer of ethylene (A) with silane group(s) containing units suitably is a low density polyethylene containing silane group(s).

High pressure radical process is produced at high pressure by free radical initiated polymerisation (referred to as high pressure (HP) radical polymerisation), optionally using a chain transfer agent (CTA) to control the MFR of the polymer. The HP reactor can be e.g. a well known tubular or autoclave reactor or a mixture thereof, preferably a tubular reactor. The high pressure (HP) polymerisation and the adjustment of process conditions for further tailoring the other properties of the polyolefin depending on the desired end application are well known and described in the literature, and can readily be used by a skilled person. Suitable polymerisation temperatures range up to 400° C., preferably from 80 to 350° C. and pressure from 70 MPa, preferably 100 to 400 MPa, more preferably from 100 to 350 MPa. Pressure can be measured at least after compression stage and/or after the tubular reactor. Temperature can be measured at several points during all steps.

Further details of the production of ethylene (co)polymers by high pressure radical polymerization can be found i.a. in the Encyclopedia of Polymer Science and Engineering, Vol. 6 (1986), pp 383-410 and Encyclopedia of Materials: Science and Technology, 2001 Elsevier Science Ltd.: "Polyethylene: High-pressure, R. Klimesch, D. Littmann and F.O. Mähling pp. 7181-7184.

In one embodiment no peroxide has been added in the polymer composition. This embodiment requires that the hydrolysable silane group(s) are introduced to the polymer of ethylene (a) with a comonomer with silane group(s) containing units that are hydrolysable by copolymerisation in a high pressure radical process.

In one embodiment of the film the polymer composition is free from dibutyltin dilaurate (DBTDL), dioctyltin dilaurate (DOTDL), which are not environmental friendly and free from compounds with sulphonic acids groups that are known to break down additives comprising amine moieties.

The polymer of ethylene (a) with a comonomer with silane group(s) containing units that are hydrolysable has an MFR$_2$ of 0.1 to 50 g/10 min, suitably 0.5 to 30 g/10 min and most suitably 10 to 25 g/10 min.

The silane group(s) containing comonomer or compound as silane group(s) containing units (b) the is a hydrolysable unsaturated silane compound represented by the formula $$R^1SiR^2_qY_{3-q} \quad (I)$$

wherein $R^1$ is an ethylenically unsaturated hydrocarbyl, hydrocarbyloxy or (meth)acryloxy hydrocarbyl group, each $R^2$ is independently an aliphatic saturated hydrocarbyl group, Y which may be the same or different, is a hydrolysable organic group and q is 0, 1 or 2.

Special examples of the unsaturated silane compound are those wherein 10 is vinyl, allyl, isopropenyl, butenyl, cyclohexanyl or gamma-(meth)acryloxy propyl; Y is methoxy, ethoxy, formyloxy, acetoxy, propionyloxy or an alkyl- or arylamino group; and $R^2$, if present, is a f wherein $R^1$ is vinyl, allyl, isopropenyl, butenyl, cyclohexanyl or gamma-(meth) acryloxy propyl; Y is methoxy, ethoxy.

In one embodiment the polymer of ethylene (a) with a comonomer with silane group(s) containing units that are hydrolysable is made in a high pressure radical process, i.e. a low density polyethylene. Another benefit from copolymerised polymer of ethylene (a) with a comonomer with silane group(s) containing units that are hydrolysable is that no spacer is present between the carbon backbone of the polymer and the silane triethoxy group and/or silane trimethoxy group, i.e. the silane atom directly is bonded to the polymer backbone. The stereochemistry for a copolymerised polymer is much more restricted due to lack of spacers, in other words the silane group is more hindered. Therefore positioning the condensation catalyst in the correct position is more difficult. That would result in lower activity of the condensation catalyst. This makes the crosslinking slower. In all grafted systems it will be at least 2 carbon atoms between the carbon backbone chain and the silane group(s) (spacers), which make the system much more reactive. This means that for a grafted system should a less reactive additive (b) with at least one amine moiety be used. It should be selected after the criteria's that the film has a gel content less than 10 wt % after 7 days at ambient conditions and a gel content of at least 15 wt % gel content after 14 days at 100° C.

In another embodiment of the invention the polymer of ethylene (a) with a comonomer with silane group(s) containing units that are hydrolysable is comprising further polar comonomers (c), excluding comonomers with silane group(s) containing units that are hydrolysable. The polymer of ethylene (a) with a comonomer with silane group(s) containing units that are hydrolysable has suitably a total amount of polar comonomers (c), excluding comonomers with silane group(s) containing units that are hydrolysable is from 10 wt % to 30 wt %, suitably 15 wt % to 30 wt %.

Examples of polar comonomers (c) are: vinyl carboxylate esters, such as vinyl acetate and vinyl pivalate, (meth) acrylates, such as methyl(meth)acrylate, ethyl(meth)acrylate, butyl(meth)acrylate and hydroxyethyl(meth)acrylate, olefinically unsaturated carboxylic acids, such as (meth) acrylic acid, maelic acid and fumaric acid, (meth)acrylic acid derivatives, such as (meth)acrylonitrile and (meth) acrylic amide, and vinyl ethers, such as vinyl methyl ether and vinyl phenyl ether. The polar ethylene is produced by a high pressure radical process.

The polar comonomers (c), excluding silane group(s) containing units, can suitably be selected from vinyl acetate (VA), buthylacrylate (BA), methylacrylate (MA), methylmethacrylate (MMA) & ethylacrylate (EA). The polar comonomers will affect the activity of the additive (b), which comprises at least one amine moiety. If the polar comonomers (c), are acidic in nature the activity of additive (b), which comprises at least one amine moiety will decrease. The overall performance of the system is the sum of all components. Most suitable polar comonomers (c), excluding silane group(s) containing are acrylates such as BA, MA, MMA and EA more suitably MA and MMA.

In one embodiment the total amount of silane group(s) in the polyethylene composition is from 0.1 wt % to 15 wt %, suitably 0.5 to 5 wt % and more suitably 0.5-2 wt %.

In another embodiment the additive (b) comprising at least one amine moiety is a stabiliser. The nature of stabilisers for polymers is that they increase the life length of the polymer composition, i.e. prevent degradation of the polymer. Degradation proceeds in radical mechanism, and will finally destroy the polymer properties. Polyolefines are going through an ageing process.

Examples of stabilisers are antioxidants (AO), Metal Deactivators (MD), UV absorbers and UV-stabilisers. AO are added to give long term stability in finished product. They also contribute to process-stability. MD is mainly used to protect from copper ions and other metal ions. Polyolefines need to be protected against UV-light. This can be done by pigments or by UV-stabilisers such as HALS (hindered amine light stabilisers).

The UV initiated degradation reaction mechanism is very similar to thermal oxidative degradation. This may indicate that phenolic AOs also act as UV-stabilisers, but they do not. The reason is that phenolic AOs are rather unstable towards UV-light. HALS, on the contrary, are UV-stable antioxidants.

In one embodiment the additive (b) comprising at least one amine moiety is a stabiliser, such as AO, MD, UV absorber or UV stabiliser, most suitably UV stabiliser and/or absorber (hereinafter referred as UV agent). If film for the layer in laminates is exposed to UV-light and is transparent an UV agent is required. This prevents the use of pigments and a high amount of UV agent is required. The UV agent should be selected to be efficient with the specific polymer composition. Therefore one objective of this invention is using a high amount of UV agent in order to crosslink the film by a condensation reaction. In the application of a film layer in a laminate, the reactivity is important. The film is made by a film producer and shipped to laminate maker. The film shall be non-crosslinked until the film is laminated. And it should be crosslinked with time after lamination. Since the UV agent is required, it is a further advantage that this system is dormant when not needed and active when needed. If the laminate is exposed to high heat, the additive (b) comprising at least one amine moiety will kick in and crosslink the film to get better creep properties.

In one embodiment according to all above embodiments, the additive (b) comprising at least one amine moiety suitably has a molecular weight (Mw) above 300 and more suitably a Mw above 600. It is commonly known that exudation is affected by the size of the stabilisers, bigger molecule have lower migration rate. In this embodiment the activity of the additive (b) with at least one amine moiety shall be relatively small, this is reached by targeting large molecules.

The polymer composition can have an UV agent and an antioxidant is present in an amount of 0.1 wt % to 5 wt %, more suitably 0.1 to 2 wt % and most suitably 0.2 to 1 wt %.

Suitably the UV agent is blend of at least two UV stabiliser(s) and/or absorber(s).

In one embodiment is the additive (b) comprising at least one amine moiety is a secondary amine.

In a preferred embodiment the additive (b) comprising at least one amine moiety is added to the polyethylene composition during film extrusion.

List of suitable AO are for example, but not exhaustive, Irganox 1098 manufactured by BASF, Naugard 445, Naugard SA & Naugard J manufactured by Chemtura, AgeRite MA, Vanox 12 & Vanox ZMTI & AgeRite White manufactured by R.T. Vanderbilt.

List of suitable MD are for example, but not exhaustive, Irganox MD 1024 from BASF, Naugard XL-1 manufactured by Chemtura, Eastman inhibitor OABH & EMD-9 manufactured by Eastman Chemical, ADK STAB CDA-1 & ADK STAB CDA-6 manufactured by Adeka cooporation.

List of suitable UV absorbers is for example but not exhaustive Tinuvin 312 manufactured by BASF.

List of suitable UV stabilisers are for example but not exhaustive, Tinuvin 123, CGL 074, Tinuvin 144, Tinuvin NOR 371, Tinuvin 622, Tinuvin 765 & Tinuvin 770, Chimasorb 944, Chimasorb 966, Chimasorb 2020 FDL, Univinyl 4050H & Uvinyl 5050 H manufactured by BASF, Cyasorb UV-3346, Cyasorb UV-3529 & Cyasorb UV-3853 manufactured by Cytec, ADK STAB LA-52, ADK STAB LA-57, ADK STAB LA-62, ADK STAB LA-63P, ADK STAB LA-67, ADK STAB LA-68 & ADK STAB LA-81 manufactured by Adeka corporation, Hostavin N 20, Hostavin N 30, Hostavin PR-31 manufactured by Clariant, Lowlite 19 manufactured by Chemtura, Uvasorb HA 88 sold by 3V, Uvasil 299 manufactured by Great Lake Chemical, Sanol LS-2626 manufactured by Sankyo.

List of more suitable UV stabilizers are Tinuvin 622, Tinuvin 770 & Chimassorb 944.

One embodiment of the invention relates a to process for making a laminate in which a polymer composition according to any previous embodiment is extruded as a film that has gel content less than 10 wt % after 7 days at ambient conditions, when measured as described in "Test methods", wherein the film is laminated without any peroxide decomposition. Benefit is no polar peroxide residues or unreacted vinyl silanes are present in the laminate. It is one object of the invention to reduce liquid additives, such as silanes and peroxides, as much as possible in the polymer composition. This will decrease problems with for example exudation, meaning the film made from the composition will be less sticky, odour less (improving working conditions significantly) and improves shelf life of the film as such. No residues can be enriched in boundaries between layers in the laminate. This will reduce risk for bubbles and delamination. Suitably the laminate has a gel content of at least 15 wt % after 14 days at 100° C. Suitably is the additive (b) comprising at least one amine moiety is added to the polyethylene composition during film extrusion.

In one embodiment the film is laminated at a temperature of 100° C. to 180° C., suitably 120° C. to 160° C.

One embodiment of the invention is a laminate with a front glass layer with at least one layer that is made of a polyethylene composition comprising (a) a polyethylene bearing hydrolysable silane group(s) and (b) at least one additive, wherein the additive is an organic compound which comprises at least one amine moiety and wherein the polymer composition has creep less than <10 mm at 100° C., 24 h, with a precondition of the creep sample of 7 days at 70° C., 95% RH, when measured as described in "Test methods".

Suitably has the polymer composition has creep less than <10 mm at 100° C., 24 h, with a precondition of the creep sample of 7 days at 70° C., 95% RH.

In a more suitable embodiment the laminate that has the layer made of the polyethylene composition is free from peroxides and tin. Peroxide free means that no peroxide has been added to the polymer composition at any stage. Tin free means that no tin has been added to the process at any stage independent on the oxidation state of the tin.

Test Methods a) Melt Flow Rate

The melt flow rate MFR2 was measured in accordance with ISO 1133 at 190° C. and a load of 2.16 kg for ethylene homo and copolymers.

b) Density: The density was measured according to ISO 1183D and ISO1872-2 for sample preparation.

d) The content (wt % and mol %) of polar comonomer present in the polymer and the content (wt % and mol %) of silane group(s) containing units (preferably comonomer) present in the polymer composition (preferably in the polymer):

Quantitative nuclear-magnetic resonance (NMR) spectroscopy was used to quantify the comonomer content of the polymer in the polymer composition.

Quantitative 1H NMR spectra recorded in the solution-state using a Bruker Advance III 400 NMR spectrometer operating at 400.15 MHz. All spectra were recorded using a standard broad-band inverse 5 mm probehead at 100° C. using nitrogen gas for all pneumatics. Approximately 200 mg of material was dissolved in 1,2-tetrachloroethane-d2 (TCE-d2) using ditertiarybutylhydroxytoluen (BHT) (CAS 128-37-0) as stabiliser. Standard single-pulse excitation was employed utilising a 30 degree pulse, a relaxation delay of 3 s and no sample rotation. A total of 16 transients were acquired per spectra using 2 dummy scans. A total of 32k data points were collected per FID with a dwell time of 60 µs, which corresponded to a spectral window of approx. 20 ppm. The FID was then zero filled to 64k data points and an exponential window function applied with 0.3 Hz line-broadening. This setup was chosen primarily for the ability to resolve the quantitative signals resulting from methylacrylate and vinyltrimethylsiloxane copolymerisation when present in the same polymer.

Quantitative 1H NMR spectra were processed, integrated and quantitative properties determined using custom spectral analysis automation programs. All chemical shifts were internally referenced to the residual protonated solvent signal at 5.95 ppm.

When present characteristic signals resulting from the incorporation of vinylacytate (VA), methyl acrylate (MA), butylacrylate (BA) and vinyltrimethylsiloxane (VTMS), in various comonomer sequences, were observed (Randel189). All comonomer contents calculated with respect to all other monomers present in the polymer.

The vinylacytate (VA) incorporation was quantified using the integral of the signal at 4.84 ppm assigned to the *VA sites, accounting for the number of reporting nuclie per comonomer and correcting for the overlap of the OH protons from BHT when present:

$$VA = (I*VA - (IArBHT)/2)/1$$

The methylacrylate (MA) incorporation was quantified using the integral of the signal at 3.65 ppm assigned to the 1MA sites, accounting for the number of reporting nuclie per comonomer:

$$MA = I1MA/3$$

The butylacrylate (BA) incorporation was quantified using the integral of the signal at 4.08 ppm assigned to the 4BA sites, accounting for the number of reporting nuclie per comonomer:

$$BA = I4BA/2$$

The vinyltrimethylsiloxane incorporation was quantified using the integral of the signal at 3.56 ppm assigned to the 1VTMS sites, accounting for the number of reporting nuclei per comonomer:

$$VTMS = I1VTMS/9$$

Characteristic signals resulting from the additional use of BHT as stabiliser, were observed. The BHT content was quantified using the integral of the signal at 6.93 ppm assigned to the ArBHT sites, accounting for the number of reporting nuclei per molecule:

$$BHT = IArBHT/2$$

The ethylene comonomer content was quantified using the integral of the bulk aliphatic (bulk) signal between 0.00-3.00 ppm. This integral may include the 1VA (3) and $\alpha$VA (2) sites from isolated vinylacetate incorporation, *MA and $\alpha$MA sites from isolated methylacrylate incorporation, 1BA (3), 2BA (2), 3BA (2), *BA (1) and $\alpha$BA (2) sites from isolated butylacrylate incorporation, the *VTMS and $\alpha$VTMS sites from isolated vinylsilane incorporation and the aliphatic sites from BHT as well as the sites from polyethylene sequences. The total ethylene comonomer content was calculated based on the bulk integral and compensating for the observed comonomer sequences and BHT:

$$E = (1/4)*[Ibulk - 5*VA - 3*MA - 10*BA - 3*VTMS - 21*BHT]$$

It should be noted that half of the a signals in the bulk signal represent ethylene and not comonomer and that an insignificant error is introduced due to the inability to compensate for the two saturated chain ends (S) without associated branch sites.

The total mole fractions of a given monomer (M) in the polymer was calculated as:

$$fM = M/(E + VA + MA + BA + VTMS)$$

The total comonomer incorporation of a given monomer (M) in mole percent was calculated from the mole fractions in the standard manner:

$$M[mol\%] = 100*fM$$

The total comonomer incorporation of a given monomer (M) in weight percent was calculated from the mole fractions and molecular weight of the monomer (MW) in the standard manner:

$$M[wt\%] = 100*(fM*MW)/((fVA*86.09) + (fMA*86.09) + (fBA*128.17) + (fVTMS*148.23) + ((1 - fVA - fMA - fBA - fVTMS)*28.05))$$

randall89

J. Randall, Macromol. Sci., Rev. Macromol. Chem. Phys. 1989, C29, 201.

It is evident for a skilled person that the above principle can be adapted similarly to quantify content of any further polar comonomer(s) which is other than MA BA and VA, if within the definition of the polar comonomer as given in the present application, and to quatify content of any further silane group(s) containing units which is other than VTMS, if within the definition of silane group(s) containing units as given in the present application, by using the integral of the respective characteristic signal.

e) Gel content (wt %): is measured according to ASTM D2765-90 using a sample consisting of said silane-cross-linked polyolefin polymer composition of the invention (Method A, decaline extraction). Ambient conditions is 23° C., 50% room humidity (RH). The RH at 50° C. to 100° C. was about 10%, if not otherwise specified.

f) Creep

Films of 0.45 mm thickness were prepared from the sample. Two samples of 30 mm*120 mm were cut from the film. Two planar surface glass slides of, 30 mm*150 mm*3.85 mm thick, were washed with isopropanol and dried were prepared. Two masks from Teflon (0.1 mm thick) with a hole of 100 mm*15 mm were also prepared.

A creep test specimen was prepared having the structure glass, mask, film, film, mask and glass. The glass slides were positioned having an offset of 20 mm. The test specimen was vacuum laminated at 150° C., 300 seconds evacuation time, 660 seconds pressing time with 800 mbar membrane pressure. The Teflon masks were preventing the polymer films to flow out, giving a well specified width and length of the laminated film.

After lamination, the Teflon masks and excess film that had not been in contact with the glass were removed. The test specimen was marked with a distance of 75 mm, corresponding to zero creep. The test specimen was inserted vertically in an oven, with specified temperature, only supporting one of the glass slides. The creep was measured as the distance relative to zero creep at specified times, thereby obtaining the distance the test specimen had moved during the test.

The creep can be seen as resistance to disposition at high temperatures of the laminate.

EXAMPLES

Materials

EVS (2.1%) MA (26%) Terpolymer produced by a high pressure tubular reactor in a conventional manner using conventional peroxide initiator, with a max temperature of 285° C., where ethylene monomers were reacted with vinyl trimethoxysilane (VTMS) and methylacrylate (MA) co-monomers amounts so as to yield 2.1 wt % vinyl trimethoxy silane content and 26 wt % MA content in the terpolymer. CTA was used to regulate MFR as well known for a skilled person. The melt flow rate (MFR2@190° C.) according to ISO 1133 (190° C., 2.16 kg) is 20 g/10 min and a melting point of 85° C.

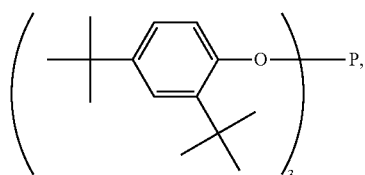

Irgafos 168, CAS-no. 31570-04-4

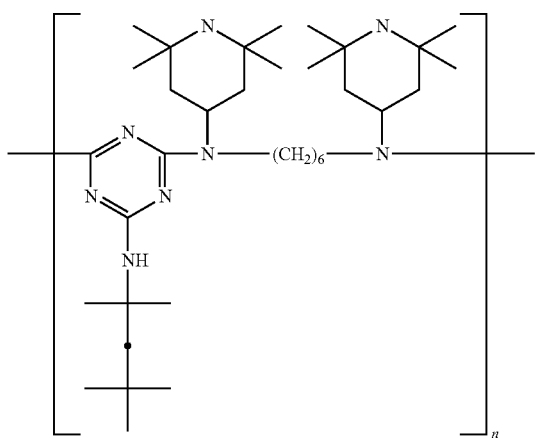

Chimassorb 944, CAS-no. 71878-19-8

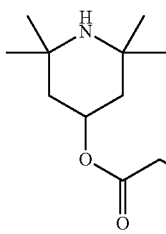

Tinuvin 770, CAS-no. 52829-07-9

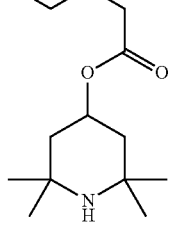

Tinuvin 622, Cas-no. 65447-77-0

Compounding of the Blends

The different compounds were compounded on a pilot scale extruder (Prism TSE 24TC). The obtained mixture was melt mixed in conditions given in the table below and extruded to a string and pelletized.

TABLE 1

Extruder setting for produced materials.

| Set Values Temperatures (° C.) | | | | | | Extruder | | |
|---|---|---|---|---|---|---|---|---|
| Zone 1 | Zone 2 | Zone 3 | Zone 4 | Zone 5 | Zone 6 | rpm | output | pressure |
| 120° C. | 140° C. | 140° C. | 140° C. | 135° C. | 130° C. | 222 | 7.7 kg/h | 55 bar |

Film Sample Preparation

Films (tapes) with a dimension of 50 mm width and 0.45 mm thickness were extruded on a Collin teach-line E 20T extruder. The tapes were produced with the following set temperatures:
150/150/150° C. and 50 rpm.

Results

TABLE 2

Results from creep test. Test was performed at directly at 100° C. Amounts of additives are given in weight percentages. AO is 0.1 wt % Irgafos 168 and 0.5 wt % of Irganox 1076.

| All are wt % | Comp 1 | Comp 2 | Comp 3 | Inv 1 | Inv 2 | Inv 3 | Inv 4 | Inv 5 | Inv 6 |
|---|---|---|---|---|---|---|---|---|---|
| EVS (2.1%) MA (26%) | 100 | 99.4 | 99.4 | 98.9 | 98.9 | 99.2 | 98.9 | 99.2 | 98.9 |
| AO | | 0.6 | 0.6 | 0.6 | 0.6 | 0.6 | 0.6 | 0.6 | 0.6 |
| Chimassorb 944 | | | | 0.5 | 0.25 | 0.1 | 0.25 | 0.2 | |
| Tinuvin 622 | | | | | 0.25 | 0.1 | | | |
| Tinuvin 770 | | | | | | | 0.25 | | 0.5 |
| Creep 100° C., 24 h | Fail | 67 mm | | 12 mm | 21 mm | 38 mm | 12 mm | | |

Table 2 shows results from creep testing of EVS (2.1%) MA (26%). The different samples have different UV-stabiliser and concentrations. The results after 24 h at 100° C. shows that the creep performance above the terpolymer melting point is improved by the addition of an amine moiety as a base catalyst for silane crosslinking even though the creep specimens have not been subjected to any preconditioning, meaning gel content is <1 wt %.

Creep specimens with films of Inventive Example 1 were prepared and subjected to preconditioning at 70° C., 95% RH. The results from creep measurements in Table 3 show the effect of amine moiety catalysed crosslinking on the creep resistance over the polymer melting temperature.

TABLE 3

The influence of preconditioning at 70° C., 95% RH on the creep resistance for Inventive Example 1.

| Days at 70° C., 95% RH | Creep at 100° C., 24 h |
|---|---|
| 0 | 12 mm |
| 4 | 0 mm |
| 7 | 0 mm |
| 14 | 0 mm |

TABLE 4

Results from gel-content measurements as a function of temperature.

|  | Gel % 0 days | Gel % 2 days | Gel % 7 days | Gel % 14 days |
|---|---|---|---|---|
| Comparative Example 3 |  |  |  |  |
| Ambient | <1 | <1 | <1 | <1 |
| 50° C. | <1 | <1 | <1 | <1 |
| 100° C. | <1 | <1 | <1 | 4 |
| Inventive Example 5 |  |  |  |  |
| Ambient | <1 | <1 | <1 | <1 |
| 50° C. | <1 | <1 | <1 | <1 |
| 100° C. | <1 | <1 | 19 | 39 |
| Inventive Example 1 |  |  |  |  |
| Ambient | <1 | <1 | <1 | <1 |
| 50° C. | <1 | <1 | <1 | <1 |
| 100° C. | <1 | 9 | 43 | 51 |
| Inventive Example 6 |  |  |  |  |
| Ambient | <1 | <1 | <1 | <1 |
| 50° C. | <1 | <1 | <1 | <1 |
| 100° C. | <1 | <1 | <1 | 36 |

From the results on gel-content measurements in Table 4 it is seen that the addition of an amine moiety will catalyse crosslinking. Especially the gel-content after 14 days at 100° C. is significantly improved. This will improve the creep resistance above the polymer melting temperature. At 50° C. there is a low crosslinking activity even after 14 days. A low gel content is needed to maintain good adhesion to various substrates.

CONCLUSION

By adding an amine moiety to a polymer of ethylene (a) with a comonomer with silane group(s) containing units that are hydrolysable, crosslinking takes place at elevated temperatures. This will improve the creep resistance of the polymer of ethylene (a) with a comonomer with silane group(s) containing units that are hydrolysable over the melting point.

The invention claimed is:

1. A process for making a laminate comprising the steps of:
   providing a polymer composition comprising a polymer of ethylene (a) with a comonomer with silane group(s) containing units that are hydrolysable and at least one additive (b), wherein the additive is an organic compound which comprises at least one amine moiety;
   extruding a film that has gel content less than 10 wt % after 7 days at 23° C. and 50% room humidity, when measured according to ASTM D2765-90;
   laminating the film without any peroxide decomposition with a glass layer; and
   condensating the silane group(s) of the polymer of ethylene (a) after lamination using the at least one additive (b), wherein the additive is an organic compound which comprises at least one amine moiety so that the laminate has a gel content of at least 15 wt % after 14 days at 100° C., when measured according to ASTM D2765-90.

2. The process according to claim 1, wherein the additive (b) comprising at least one amine moiety is added to the polymer composition during film extrusion.

3. The process according to claim 1, wherein the film is laminated at a temperature of 100° C. to 180° C.

4. The process according to claim 1, wherein the polymer of ethylene (a) with a comonomer with silane group(s) containing units that are hydrolysable is in an amount of at least 80 wt % of the polymer composition.

5. The process according to claim 1, wherein the polymer of ethylene (a) with a comonomer with silane group(s) containing units that are hydrolysable has a density of at least 900 kg/m$^3$ and an MFR$_2$ of 0.1 to 50 g/10 min measured with ISO 1330 at 190° C. and a load of 2.16 kg.

6. The process according to claim 1, wherein the polymer of ethylene (a) with a comonomer with silane group(s) containing units that are hydrolysable is a low density polyethylene.

7. The process according to claim 1, wherein the polymer of ethylene (a) with a comonomer with silane group(s) containing units that are hydrolysable further comprises polar comonomers (c), excluding comonomers with silane group(s) containing units that are hydrolysable.

8. The process according to claim 7, wherein the polymer of ethylene (a) with a comonomer with silane group(s) containing units that are hydrolysable further comprises a total amount of polar comonomers (c), excluding comonomers with silane group(s) containing units that are hydrolysable is from 10 wt % to 30 wt %.

9. The process according to claim 8, wherein the polar comonomers (c), excluding silane group(s) containing units, is selected from vinyl acetate (VA), butyl acrylate (BA), methyl acrylate (MA), methyl methacrylate (MMA) and ethyl acrylate (EA).

10. The process according to claim 1, wherein the total amount of silane monomer in the polymer of ethylene (a) with a comonomer with silane group(s) containing units that are hydrolysable is from 0.1 wt % to 15 wt %.

11. The process according to claim 1, wherein the additive (b) comprising at least one amine moiety is a stabiliser.

12. The process according to claim 11, wherein the additive (b) comprising at least one amine moiety includes at least one UV agent.

13. The process according to claim 11, wherein the additive (b) comprising at least one amine moiety includes at least one UV stabilizer.

14. The process according to claim 11, wherein the at least one additive (b) comprising at least one amine moiety comprises an UV stabiliser and an antioxidant and is present in the polymer composition in an amount of 0.1 wt % to 5 wt %.

15. The process according to claim 11, wherein the additive (b) comprising at least one amine moiety is a secondary amine.

16. The process according to claim 1, wherein the polymer composition is free of peroxides, dibutyl tin dilaurate (DBTDL), dioctyl tin dilaurate (DOTDL) and compounds with sulphonic acid groups.

17. A laminate of a glass layer with at least one layer that is made of a polymer composition according to the process of claim 1 comprising:
  (a) a polyethylene bearing hydrolysable silane group(s), and
  (b) at least one additive, wherein the additive is an organic compound which comprises at least one amine moiety;
  and wherein the at least one layer that is made of the polymer composition polymer composition has creep less than <10 mm at 100° C., 24 h, with a precondition of the creep sample of 7 days 70° C., RH95%.

18. A laminate according to claim 17, wherein the layer made of the polymer composition is free from peroxides and tin.

* * * * *